(12) United States Patent
Jackson et al.

(10) Patent No.: US 7,373,726 B2
(45) Date of Patent: May 20, 2008

(54) RETRO-REFLECTIVE TARGET WAFER FOR A POSITION DETERMINATION SYSTEM

(75) Inventors: David A. Jackson, Point Roberts, WA (US); Rodney Harrell, Greenbrier, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 28 days.

(21) Appl. No.: 11/588,329

(22) Filed: Oct. 27, 2006

(65) Prior Publication Data

US 2007/0101595 A1 May 10, 2007

Related U.S. Application Data

(60) Provisional application No. 60/730,830, filed on Oct. 28, 2005.

(51) Int. Cl.
*G01B 11/275* (2006.01)
(52) U.S. Cl. .................. 33/293; 33/203.18; 33/288
(58) Field of Classification Search .............. 33/293, 33/203.18, 288
See application file for complete search history.

(56) References Cited

U.S. PATENT DOCUMENTS

| | | | |
|---|---|---|---|
| 4,343,550 A * | 8/1982 | Buckley et al. ............ 356/4.01 |
| 4,863,819 A | 9/1989 | Drexler et al. |
| 5,073,005 A | 12/1991 | Hubbs |
| 5,202,168 A | 4/1993 | Turner et al. |
| 5,532,816 A * | 7/1996 | Spann et al. ............ 356/139.09 |
| 5,535,522 A | 7/1996 | Jackson et al. |
| 5,724,743 A | 3/1998 | Jackson et al. |
| 5,943,783 A * | 8/1999 | Jackson ....................... 33/288 |
| 6,134,792 A * | 10/2000 | January ................... 33/203.18 |
| 6,148,528 A * | 11/2000 | Jackson ....................... 33/288 |
| 6,526,665 B2 | 3/2003 | Jackson |
| 6,839,972 B2 * | 1/2005 | Jackson et al. ............... 33/286 |
| 6,931,736 B2 * | 8/2005 | Stopa ........................... 33/203 |
| 7,089,776 B2 * | 8/2006 | Dale, Jr. ....................... 73/1.75 |
| 2002/0034320 A1 * | 3/2002 | Mann ........................... 382/118 |
| 2004/0080949 A1 | 4/2004 | Klotz et al. |
| 2004/0139620 A1 * | 7/2004 | Stopa ....................... 33/203.18 |
| 2005/0060899 A1 * | 3/2005 | Jackson et al. ........... 33/203.18 |

OTHER PUBLICATIONS

Hunter Engineering Co. Product Literature, Form No. 4240T, "DSP400 Alignment Senors", dated Jan. 1999, consisting of 5 folded pages.*
International Search Report for International Application PCT/US2006/042072 Completed Feb. 27, 2007.

* cited by examiner

*Primary Examiner*—Christopher W Fulton
(74) *Attorney, Agent, or Firm*—McDermott Will & Emery LLP

(57) ABSTRACT

A target that is usable in a position determination system such as, for example, a wheel alignment system, is structurally stable over wide temperature ranges, protected from humidity and chemical contamination, and not subject to breakage. A layered target structure includes a substrate board, a retro-reflective layer formed on the substrate board, a transparent sheet overlaying the retro-reflective layer, and an opaque patterned layer between the a retro-reflective layer and the transparent sheet. The layered target structure may be secured a support assembly.

20 Claims, 4 Drawing Sheets

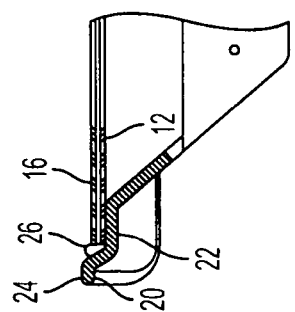
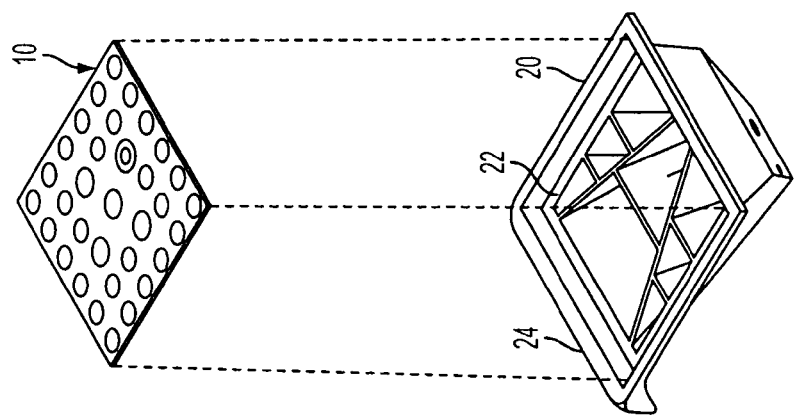
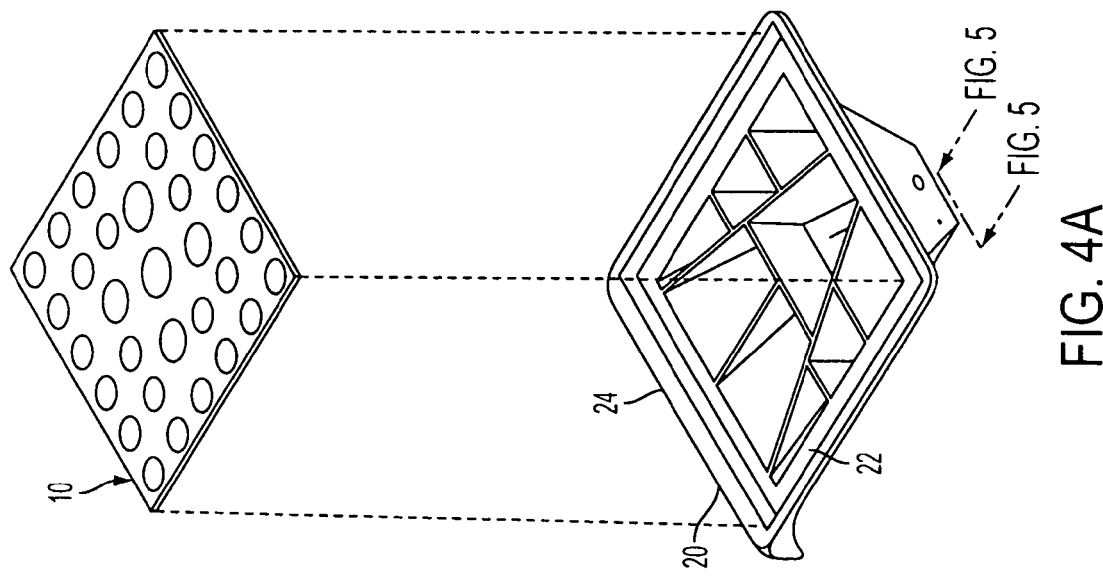

RETRO-REFLECTIVE TARGET WAFER FOR A POSITION DETERMINATION SYSTEM

RELATED APPLICATION

This application claims the benefit of U.S. Provisional Application No. 60/730,830, filed Oct. 28, 2005, entitled "RETRO-REFLECTIVE TARGET WAFER FOR IMAGE ALIGNMENT," the disclosure of which also is entirely incorporated herein by reference.

TECHNICAL FIELD

The present disclosure relates to visual position determination systems, more particularly to retro-reflective target wafers used in vision imaging.

BACKGROUND

Certain types of position determination systems, such as wheel alignment systems, use a vision imaging system that employs optical sensing devices to determine the positions of various target devices. A wheel alignment system of this type is capable of obtaining alignment information about a vehicle, such as toe, camber, ride height, toe curve, tilt angle, and the angular relationship of the vehicle's body relative to the vehicle's wheels.

The wheels of a motor vehicle may be aligned in a number of ways. For example, an operator or an alignment technician can use a vision imaging system, such as a computer-aided, three-dimensional (3D) machine vision that employs image sensing devices, such as cameras, to determine the positions of various target devices. Although such vision imaging systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998, U.S. Pat. No. 5,535,522, entitled "Method and Apparatus for Determining the Alignment of Motor Vehicle Wheels," issued to Jackson, et al. on Jul. 16, 1996, and U.S. Pat. No. 6,526,665, entitled "Glint-Resistant Position Determination System, issued to Jackson on Mar. 4, 2003, each incorporated herein by reference.

A computer is often used in conjunction with such vision imaging systems to calculate the orientation of the target device by identifying certain geometric characteristics on the target device. The computer takes perspective measurements and compares these measurements with the true image previously pre-programmed into the memory of the computer.

An example of a typical target device that can be used in a wheel alignment system is illustrated in FIG. 1. Target device 64 consists of a flat plate with a pattern of two or more differently sized circles 62, 63 marked in a predetermined format thereon. Although a specific pattern is shown, a large number of different patterns can be used on the target device 64. In practice, a mathematical representation, or data corresponding to a true image (i.e. an image taken by viewing the target device perpendicularly to its primary plane) and the dimensions of the target device are preprogrammed into the memory of a computer so that, during the alignment process, the computer has a reference image to which the viewed perspective images of the target devices can be compared.

The computer calculates the orientation of the target device 64 by identifying certain geometric characteristics on the target device. The computer takes perspective measurements and compares these measurements with the true image previously pre-programmed into the memory of the computer.

The computer could, for example, calculate the center of each of the circles 62a, 62b by means of centroiding. This is a method commonly used by image analysis computers to determine the positioning of the center point or centerline of an object. Once the center points of the two circles 62a, 62b have been determined, the distance between the two can be measured. This process is then repeated for other circles in the pattern on the target device 64. These distances can then be compared to the true distances (i.e. non-perspective distances) between the respective centers. Similarly, the angle to the horizontal (or vertical) of the line joining the two centers can be determined. A calculation can then be made of the orientation of the target device 64.

Other methods of calculation can be used to determine the orientation of the target device 64. For example, the camera could sight onto only one of the circles, for example the circle 63, and by using the perspective image thereof (the distorted ellipse), calculate the orientation of that circle and, therefore, the orientation of the target device 64, as more fully described in U.S. Pat. Nos. 5,535,522 and 5,724,743.

Existing targets commonly contain retro-reflective sheets sandwiched between front and back sheets of glass for protection from humidity and chemical contamination. The retro-reflective sheets generally comprise a rather fragile material. Neither glass layer adheres to the retro-reflective sheet. The combination is glued at its edges to a housing using hard epoxy glue to provide a seal and permanent attachment to the housing.

Wheel alignment systems are used predominantly in establishments such as automobile service centers, tire dealer shops, garages, repair shops, and the like. Such environments can subject the systems to a wide range of temperature, e.g., in the order of zero degrees F. to one hundred thirty degrees F. System targets additionally are often exposed to extremes of humidity and various harmful chemical products. Rough handling of the targets when being positioned on or removed from wheels is commonplace. Such handling of the target may cause the glue bond to loosen and allow humidity to wrinkle the retro-reflective sheet that is positioned between the two layers of glass. Resulting distortion can significantly affect the accuracy of the positioning system. Moreover, glass coverings of existing targets, as well as fragile retro-reflective material, can easily be broken if mishandled or dropped, rendering the targets unusable. Impact can be transferred through perimeter epoxy glue, imparting stresses to the glass elements with consequent breakage.

The need remains for alignment retro-reflective targets that are structurally stable over wide temperature ranges, that are protected from humidity and chemical contamination, and are better protected from breakage.

SUMMARY OF THE DISCLOSURE

The subject matter described herein overcomes these shortcomings. The use of glass layers, which are subject to breakage, has been eliminated. A physically strong, thermally stable, board is provided as a base to which thin retro-reflective material is adhered. Such adhesion ensures that the retro-reflective material becomes a composite of the backing material. The retro-reflective material will not be subject to wrinkling or damage from humidity. A transparent material, having a high resistance to breakage, is applied as an outer layer and is glued to the retro-reflective material. The combination can then be glued along its periphery to a supporting structure to provide a seal against humidity and contamination.

The board may comprise a printed circuit board such as, for example, a board known in the industry as FR-4 board. Other thermally stable materials, such as aluminum plate, copper plate, etc., can be used in lieu of the board. The outer layer may comprise an acrylic sheet A target pattern may be photo exposed on a thin opaque layer of photo sensitive epoxy glue, or equivalent, formed on the inner surface of the outer sheet. Target images, such as circles, are thus formed and surrounded by the opaque material. An additional thin layer of glue may be used to bond the outer layer to the retro-reflective sheet.

Alternatively, a photo etching process to deposit opaque epoxy ink may be carried out directly on the face of the retro-reflective material after it has bonded to the board. The outer layer may thereafter be glued with epoxy to the retro-reflective sheet. If a retro-reflective material and epoxy ink are used that are not easily scratched or damaged, an outer layer of protection may be omitted.

BRIEF DESCRIPTION OF THE DRAWINGS

Implementations of the present invention are illustrated by way of example, by way of limitation, in the figures of the accompanying drawings and in which like reference numerals refer to similar elements.

A typical prior art wheel alignment system target device is illustrated in FIG. 1.

FIGS. 4A and 4B are exploded views, respectively, of rear and front targets and support structure in accordance with the present invention.

FIG. 5 is a partial sectional view of a target and support structure of FIGS. 4A and 4B.

DETAILED DESCRIPTION

Figure 2:
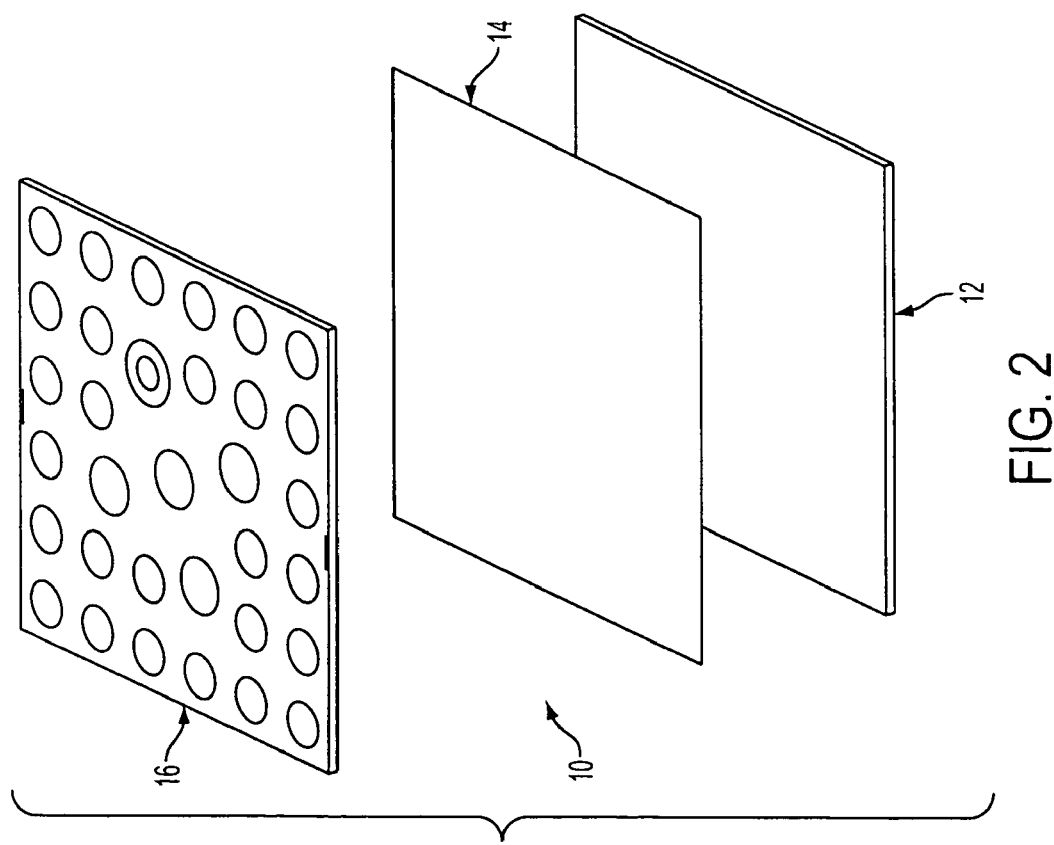
FIG. 2 is an exploded view of a target composite in accordance with the present invention.

A composite target 10 is shown in FIG. 2. A thermally stable and structurally sturdy board 12 serves as a backing for a thin, highly retro-reflective, sheet 14. Retro-reflective sheet 14 may be adhered to the board 12. Outer layer 16 is a scratch resistant, non-breakable transparent material. Layer 12 may be composed of a printed circuit board material, such as FR-4, or other stable materials, such as aluminum plate and copper plate. Layer 16 may comprise an acrylic sheet or an equivalent material.

Figure 1:
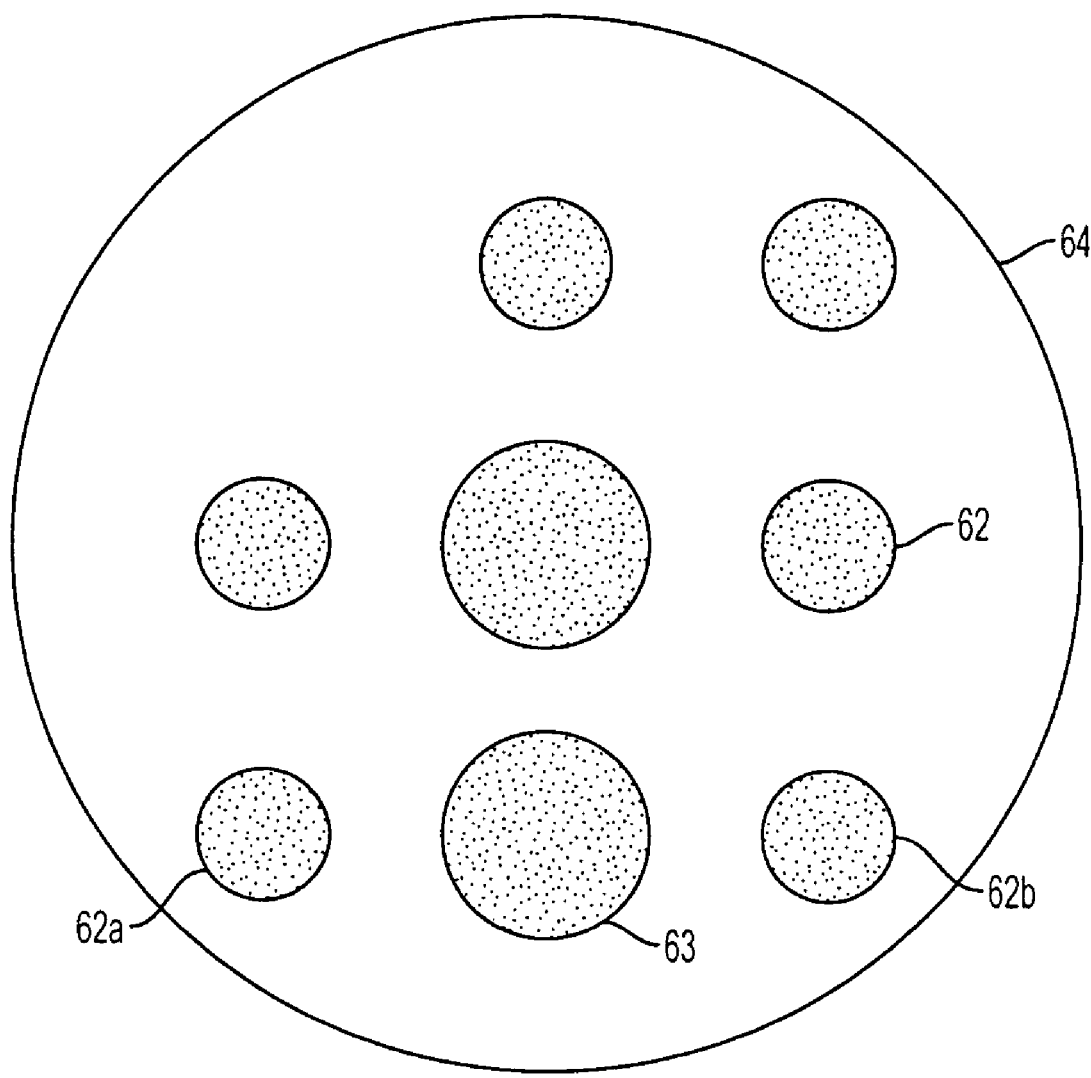
Figure 3:
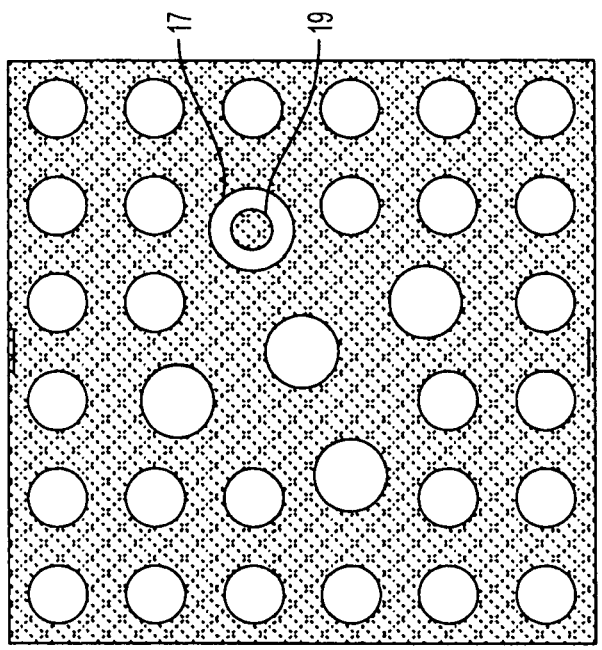
FIG. 3 is a more detailed plan view of a target configuration shown in FIG. 2.

Layer 16 contains the target circles shown in more detail in the plan view of FIG. 3. The target circle configuration shown may represent a front wheel target. A large circle 17 is shown encircling a smaller circle 19, which can provide a reference for the system. The particular pattern used may be varied, as long as the system can derive sufficient information to identify the target with the wheel to which it is to be attached and to configure the coordinate system accordingly. A rear wheel target configuration may contain a different reference icon, such as a large circle without an inner circle.

FIGS. 4A and 4B are exploded views, respectively, of rear and front composite targets 10 and support structure 20. FIG. 5 is a partial sectional view of target and support structure configuration taken, for example, at a section A-A of FIG. 4A. Support structure 20 contains a ledge 22 along its peripheral region upon which the composite target 10 is seated. Raised outer edge 24 surrounds target 10 for setting its position on the structure. Composite target 10 is secured at its peripheral edges to support structure 20 along the juncture of ledge 22 and edge 24 by a thin layer 26 of epoxy glue or equivalent adhesive.

Manufacture of the composite target 10 may be performed by several alternative processes. In one such process, a target pattern is formed on the inner surface of a transparent acrylic sheet 16, or equivalent. A thin layer of opaque, photo sensitive epoxy glue, or equivalent material, is applied to the inner surface and may be allowed, at least somewhat, to cure. Application of the material may be performed, for example, by a silk screen process.

A master mask template, which has a highly accurate negative target pattern, is overlaid on the thin layer of photosensitive material on the inner surface of sheet 16. For this material a commercially available substance, for example, PSR-4000/CA-40, produced by Taiyo, may be utilized. This substance is a two part liquid photo imageable solder mask that has no odor, has a fast photo speed, and is designed to produce a high-resolution image. An interferrometric plotter may be used to obtain the highly accurate negative pattern. The master template, for example, may comprise a glass sheet with the negative pattern formed by chrome or equivalent substance interferrometrically plotted onto the glass. Light, such as ultraviolet light, is applied to the thin photosensitive layer through the mask plate. Areas not masked by the master template are exposed to the light and fully cure. Areas masked by the template do not cure. Uncured areas are washed away during a chemical rinse.

The rear surface of retro-reflective sheet 14 may contain adhesive with a removable backing strip. Sheet 14 may be adhered to board 12 by first aligning these sheets and applying a thin adhesive backer strip to the board 12 to preserve the alignment. The assembly may then be fed through rollers while the backing sheet is removed from sheet 14. Light roller pressure is applied while avoiding trapping of visible air bubbles under sheet 14. Removal of the backing strip permits application of the retro-reflective material sheet 14 securely to the board 12 without wrinkling, while providing protection against damage from humidity.

A thin layer of glue may be used to bond the patterned outer sheet 16 to the retro-reflective sheet 14 after the latter has bonded with board 12. An opaque epoxy glue or equivalent may be used. The glue may be applied to the inner surface of patterned sheet 16 by a silk screen process. A silk screen pattern permits the glue to be applied only to the dark areas of sheet 16. For a circle target pattern, such as illustrated in FIGS. 2 and 3, the silk screen pattern contains circles that overlap the target circles. The silk screen circles are sufficiently larger than the target circles to prevent the glue from overlapping the target pattern, thus maintaining the accuracy of the pattern. After screening the parts are allowed to air dry until a desired tackiness is achieved. Sheets 14 and 16 are then glued together. A jig may be used to align the two sheets. While aligned, sheet 14, which had been silk screened with the glue, is lightly pressed onto sheet 16. Constant pressure is maintained while the glue dries. Heat may be applied to speed the drying process.

The three layer target composite is then placed on ledge 22 of the support structure 20 and glued at its periphery to the edge 24 of the support frame. Epoxy or urethane glue, or equivalent, may be used to form a sealed beading 24 at the periphery of the target composite sheet.

As an alternative process, retro-reflective material 14 may first be adhered to the board 12. Next, a photo etching process can be carried out directly on the face of layer 14. Photo sensitive material may be applied to layer 14 and then exposed to light through a mask template. After development of the pattern on sheet 14, a layer of glue can be applied through a silk screen process to sheet 14 in a manner such as previously described. Outer layer 16 is then glued to the layer 14.

In another embodiment, the outer layer 16 can be deleted by the use of a retro-reflective material that is not easily scratched or otherwise damaged. With such an arrangement, the retro-reflective material 14 is adhered to the thermally stable plate 12. Then, a photo etching process deposits a layer of black opaque ink directly on the face of the retro-reflective material. The resulting composite may then be glued at its edges to the supporting structure 20.

Figure 6A:
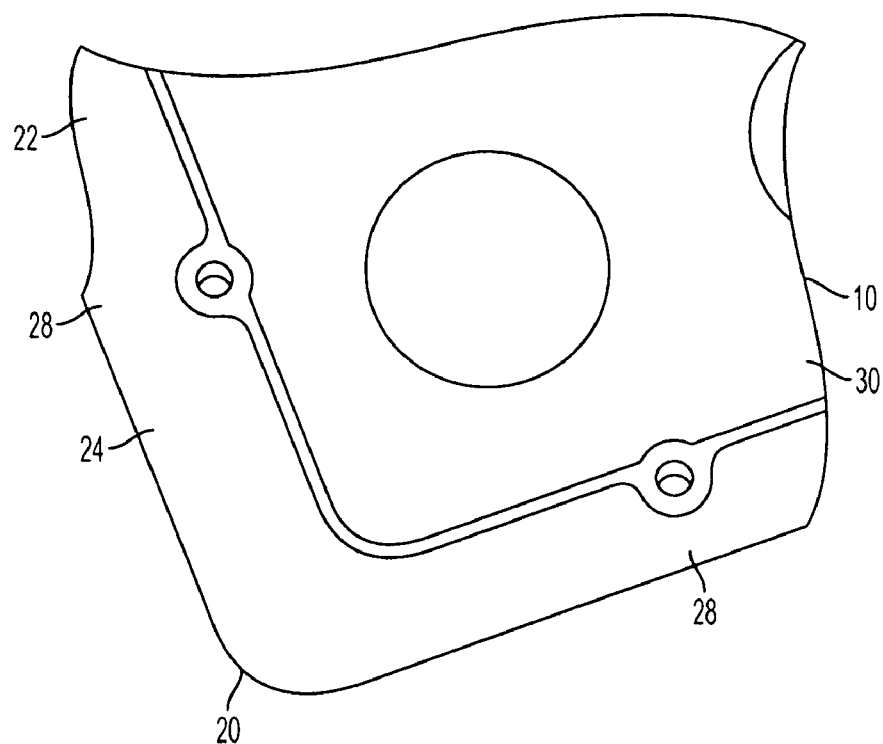
FIGS. 6A-6B are illustrative views of an embodiment for mounting a target to a support structure.

Various alternatives may be used in lieu of peripherally applied adhesive for retention of the composite target 10 to the support structure 20. One such alternative comprises provision of target frame and seal members, as illustrated in FIGS. 6A-6D. As shown in FIG. 6A, the composite target 10 is positioned on ledge 22, which is recessed within the edges 24 of the support structure 10. Ledge 22 contains mounting holes 28. Overlapping the periphery of the target 10 is a seal 30, a bottom corner portion of which is shown in FIG. 6D. The seal comprises a top layer 32 that overlaps the target and a side layer 34 that surrounds the edge of the target.

Figure 6B:
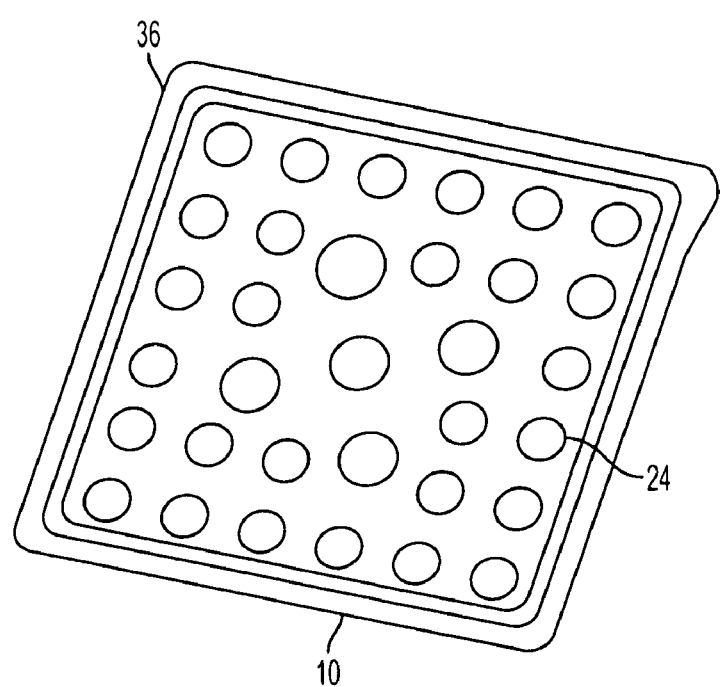

A frame 36, partially shown in a bottom view in FIG. 6C, comprises a top surface 38 and side surfaces 40. The side surfaces comprise through holes 42. Frame 36 is configured to overlap the seal 30 and target 10, with through holes 42 in alignment with through holes 28 of ledge 22. In fabrication of the completed structure, screw fasteners or the like retain ledge 22, seal 30 and frame 40 in tight engagement with housing 44, as shown in FIG. 6B. Screws may be inserted through holes in the bottom of the housing (not shown) and retained in aligned holes within the top portion of the housing.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, although the invention has been described in the context of wheel alignment, it is applicable to a variety of other position determination systems. The particular target configurations disclosed are merely exemplary. The invention may be used, for example, with different circular, geometrical or other arbitrarily configured targets.

What is claimed is:

1. A method for creating a target usable in a position determination system, the method comprising the steps of:
   applying retro-reflective material to a board;
   depositing photosensitive material to the retro-reflective material; and
   photo-etching a pattern on the photosensitive material.

2. A method as recited in claim 1, wherein the step of photo-etching comprises:
   aligning a mask template on the photosensitive material;
   exposing the photosensitive material to light through the mask template; and
   developing portions of the photosensitive material that have been exposed.

3. A method as recited in claim 1, further comprising the step of applying a layer of glue to the patterned photosensitive material through a silk screen process.

4. A method as recited in claim 1, wherein the board comprises a thermally stable material.

5. A method as recited in claim 4, wherein the thermally stable material comprises printed circuit board.

6. A method as recited in claim 1, further comprising the step of attaching the board to a support housing.

7. A method for creating a target usable in a position determination system, the method comprising the steps of:
   applying a layer of opaque, photo sensitive material on an inner surface of a transparent sheet;
   forming a master mask template having a negative target pattern;
   overlaying the mask template on the photo sensitive material;
   exposing the photosensitive layer to light through the mask template;
   removing masked areas of the photo sensitive material to form a patterned configuration;
   attaching a retro-reflective structure to the patterned inner surface of the transparent sheet.

8. A method as recited in claim 7, wherein the photo sensitive material comprises epoxy glue.

9. A method as recited in claim 8, wherein the step of applying photo sensitive material comprises a silk screen process.

10. A method as recited in claim 7, wherein the step of forming a mask template is performed with an interferrometric plotter to obtain an accurate negative pattern.

11. A method as recited in claim 7, wherein the step of attaching a retro-reflective structure comprises:
    applying glue to masked areas of the inner surface of the patterned sheet; and
    bonding the glued inner surface of the sheet to a retro-reflective sheet.

12. A method as recited in claim 11, wherein the step of applying glue to the inner surface of the patterned sheet comprises forming a silk screen pattern that does not overlap masked areas of the sheet.

13. A method as recited in claim 7, wherein the step of attaching a retro-reflective structure comprises:
    forming an adhesive strip having a removable backing on one surface of a retro-reflective sheet;
    aligning the retro-reflective sheet with a thermally stable board;
    securing the aligned adhesive surface of the retro-reflective sheet to the board while removing the backing; and
    bonding an opposite surface of the retro-reflective sheet to the patterned sheet.

14. A method as recited in claim 7, further comprising the step of fixing the sheet and a retro-reflective structure to a support housing.

15. A target structure in an optical sensing, position determination system, the target structure comprising:
    a substrate board;
    an retro-reflective layer formed on the substrate board;
    a transparent sheet overlaying the retro-reflective layer; and
    an opaque patterned layer formed between the retro-reflective layer and the transparent sheet.

16. Target structure as recited in claim 15, wherein the opaque patterned layer comprises photosensitive material formed on the retro-reflective layer.

17. Target structure as recited in claim 15, wherein the opaque patterned layer comprises photosensitive material formed on the transparent sheet.

18. Target structure as recited in claim 15, wherein the opaque patterned layer comprises photosensitive epoxy glue, formed by exposure through a patterned mask.

19. Target structure as recited in claim 15, wherein the substrate comprises a printed circuit board.

20. Target structure as recited in claim 19, further comprising a support assembly to which the target layers and substrate are secured.

* * * * *